UNITED STATES PATENT OFFICE.

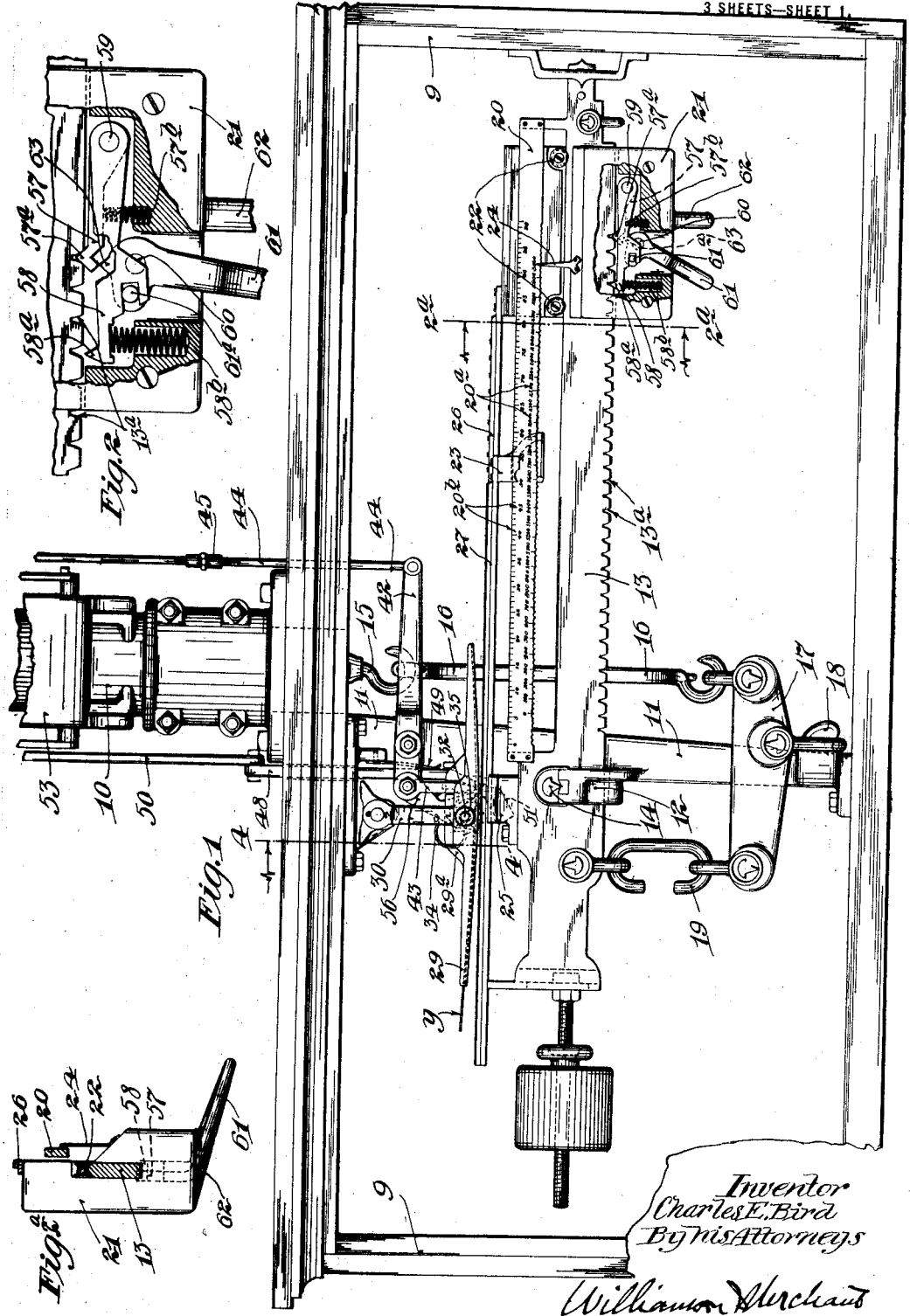

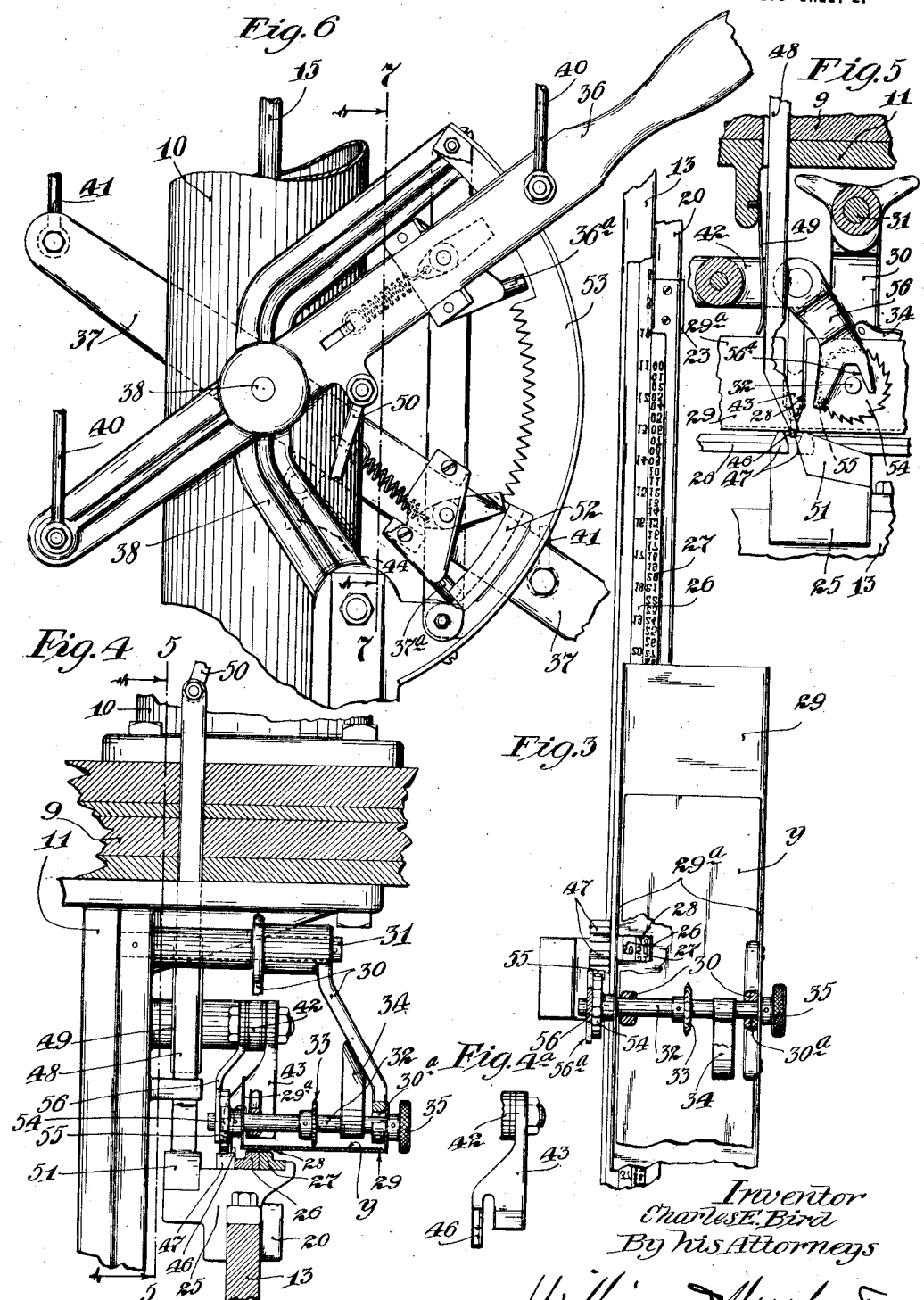

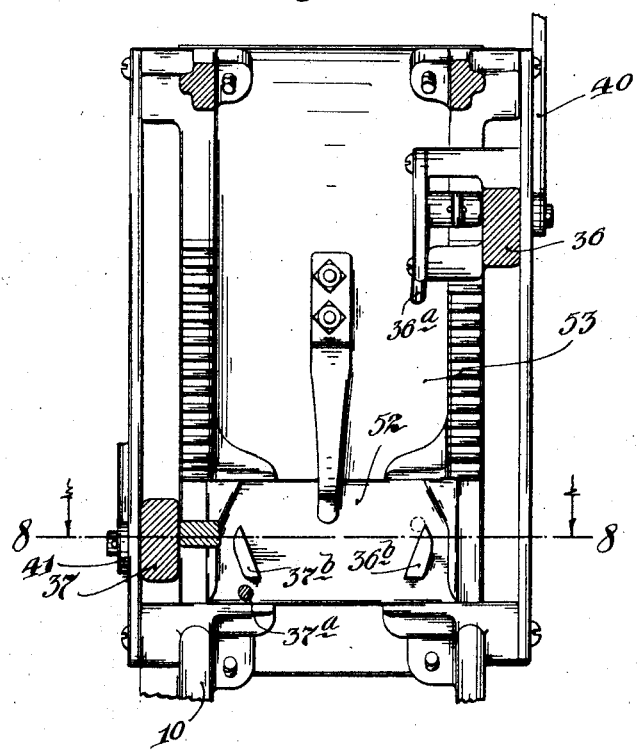
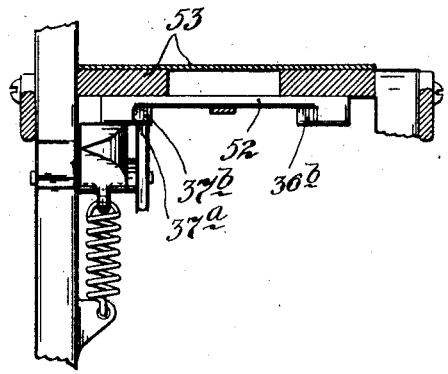

CHARLES E. BIRD, OF MINNEAPOLIS, MINNESOTA.

WEIGHING-SCALE.

1,359,223.  Specification of Letters Patent.  Patented Nov. 16, 1920.

Application filed May 26, 1919. Serial No. 299,948.

*To all whom it may concern:*

Be it known that I, CHARLES E. BIRD, a citizen of the United States, residing at Minneapolis, in the county of Hennepin and State of Minnesota, have invented certain new and useful Improvements in Weighing-Scale; and I do hereby declare the following to be a full, clear, and exact description of the invention, such as will enable others skilled in the art to which it appertains to make and use the same.

My present invention relates to weighing scales, and more particularly to scales used in connection with weighing hoppers. The invention is directed particularly to a simple and efficient automatic printing mechanism for printing the weight of the hopper loads on a ticket. In the loading of cars with bulk grain or other free flowing materials requiring several hopper loads to load a car, it has been hitherto customary to provide the scale beams with a hand operated printing device arranged to print the weight of each hopper load on an individual ticket. In such an arrangement there is always a chance that the operator may forget to print the weight of some hopper load on the individual ticket or ticket strip, and there is also a possibility of duplication because there is not positive essential relation between the printing or recording and the weighing action.

My invention provides a printing mechanism of such character that a proper ticket being placed in position and the several actions required for weighing the several hopper loads carried out, the automatic printing on the ticket of the weights of the several hopper loads, will be automatically performed.

The invention also involves other important novel features, and combinations of devices, as will hereinafter appear.

In the accompanying drawings which illustrate the invention, like characters indicate like parts throughout the several views.

Referring to the drawings:—

Figure 1 is a view in front elevation showing the scale beam and associated parts of the scale;

Fig. 2 is a fragmentary view in front elevation, with some parts being shown in section, illustrating novel features involved in the main poise of the scale;

Fig. 2ª is a section on the line 2ª—2ª of Fig. 1;

Fig. 3 is a fragmentary plan view with some parts broken away and some parts sectioned showing the ticket-supporting table, ticket feeding device, and portions of the main and fractional type bars;

Fig. 4 is a transverse vertical section taken approximately on the line 4—4 of Fig. 1;

Fig. 4ª is an elevation of the printing plunger;

Fig. 5 is a vertical longitudinal section taken approximately on the line 5—5 of Fig. 4.

Fig. 6 is a detail in side elevation of the lever mechanism for operating the supply and discharge gates;

Fig. 7 is a section taken approximately on the line 7—7 of Fig. 6, some parts being removed; and Fig. 8 is a fragmentary horizontal section on the line 8—8 of Fig. 7.

The present invention may be applied to various different types of scales, but in the drawings, it is illustrated as applied to a scale of the suspended type, such as that disclosed and broadly claimed in my prior Patent No. 1,274,977, of date Aug. 6, 1918. The suspended frame of this scale is indicated as an entirety by the numeral 9, and as shown, is of rectangular form, the top thereof, being secured to the lower end of a depending column 10. A metallic pedestal 11 is secured to the top and bottom of the frame 9, and is provided with fulcrum lugs 12, on which the scale beam 13 is fulcrumed by means of knife-edge fulcrum lugs 14. The numeral 15 indicates a long steelyard rod or beam rod that extends freely downward through the suspended column 10, and the lower end of which is connected by a link 16, to one end of a shelf lever 17 located within the framework 9. This lever 17 is intermediately fulcrumed to the lug 18 on the lower portion of the column 10 and the rear end of said lever is connected by a link 19 to the short rear end of scale beam 13.

In this particular type of scale mechanism, the steelyard rod 15 at its upper end, will be connected to the main scale lever, which as illustrated in my said prior patent, is located high above the beam proper. For the purpose of this case, it is sufficient to bear in mind that the load force is transmitted to the scale beam 13, through the steelyard rod 15.

The scale beam 13 is provided with a graduated scale bar 20 that extends parallel therewith, and as shown, is rigidly connected to, but vertically offset from, the beam proper, but constitutes a part of said beam.

The under edge of scale beam 13 is notched at $13^a$, and mounted to slide on said beam is a main poise 21, shown as provided with small anti-friction wheels 22 that run on the upper edge of said beam. A fractional poise 23 is mounted to slide on the bar 20. Main poise 21 is provided with a pointer 24, that coöperates with graduations $20^a$ on the lower portion of said bar 20. These lower graduations $20^a$ correspond to the notches $13^a$, each notch usually representing one-hundred pounds. For coöperation with the so-called fractional poise 23, the upper portion of scale bar 20 is provided with graduations $20^b$, which in the arrangement illustrated, indicate pounds. Movement of the main poise 21 from one notch to another, gives a variation of one-hundred pounds in weight, while movement of the fractional poise 23 one space on scale graduation $20^b$, gives a variation of one pound in weight.

Mounted on scale beam 13, nearly parallel and directly above its pivot 14, is a platen or anvil block 25. For performing the printing action, I provide two type bars 26 and 27, which are located side by side, mounted to slide in a guide channel formed in the top of the platen 25, or extended parallel to the beam 13, and are attached, the former to the main poise 21 and the latter to the fractional bar 23. The main type bar 26 is provided on its upper face with numerical type spaced to correspond to the notches $13^a$ of the scale beam, and indicating the number of hundreds of pounds weighed on the scale beam by the main poise 21. The supplemental or fractional type bar 27 on its upper face is provided with numerical type representing the number of pounds weighed on the scale beam by the fractional or supplemental poise 23, and spaced to correspond to the pound spaces of the graduations $20^a$. With this arrangement, it is evident that when the two poises 21 and 23 are set to balance the scale beam, the numerical type on the two type bars will be assembled at the printing point, that is, alined above the platen 25, in such manner that they will indicate the total weight represented by the setting of the two poises. To illustrate, (see Fig. 3), if the two bars are set so that the type numerals 20 of both bars are alined, the alined numerals of the two bars at the printing point will indicate 2020.

The so-called printing point is immediately below a passage 28 of a ticket-supporting table 29, upon which the ticket Y is placed. This so-called table 29 at its side edges, has upturned flanges $29^a$, which at the longitudinal center of the table, are rigidly secured to the lower ends of the arms of an approximately U-shaped yoke 30, the sleevelike upper end of which is pivoted on a stud 31, that projects laterally from the upper portion of the pedestal 11, so that the said table is hung for pivotal movements on the said stud. By reference to Fig. 1, it will be noted that the bottom of the table 29 is slightly curved, so that its end portions are considerably above the type faces of the bars 26 and 27, while its central portion has but very slight clearance therefrom. In Fig. 4, the left or inner arm of the yoke 30 is broken away at its central portion so as to better show other parts.

For feeding the ticket Y on the upper face of the table 29, a small shaft 32 is extended through and journaled in the upturned flanges of said table and in the arms of the yoke 30. At its intermediate portion, this shaft 32 is provided with a toothed wheel 33, the teeth of which engage the ticket to insure the proper feeding movement thereof. The outer end of shaft 32 is capable of slight vertical movement in a slot $30^a$ formed in the outer arm of the yoke 30 and in the outer flange of the table 29. A U-shaped leaf spring 34 is anchored at one end to the outer arm of yoke 30, and its free end yieldingly pressed downward on the shaft 32 so as to normally hold the teeth of wheel 33 engaged with the ticket Y; said slot permits the wheel to be disengaged from the ticket by lifting the outer end of said shaft. At its outer end, said shaft is provided with a knurled end 35, by means of which said shaft may, when desired, be moved by hand to move the ticket on the face of the table.

In hopper scale mechanism such as disclosed in my prior patent, and in various other types, it is customary to provide two levers, one for operating the supply gate to the hopper, and the other for operating the discharge gate from the hopper. Such scale levers are illustrated in Fig. 6, where the supply gate lever is indicated by the numeral 36 and the discharge gate lever is indicated by the numeral 37. These two levers, as shown, are pivoted at 38 to a segment 39 that is rigidly secured to column 10. Lever 36 is connected to the hopper supply gate, not shown, by the usual or any suitable way through rods 40, while lever 37 is connected to the hopper discharge gate, not shown, in the usual or any suitable way, through rod 41. When two levers 36 and 37 are in their lowered positions, both gates will be closed, and when either of the said levers is raised, the gate operated thereby, will be opened.

The printing of the record on the ticket by the alined type at the print point, is produced automatically by an upward movement of the lever 37, which movement is required to open the discharge gate. To produce this printing action, a lever 42 (see Fig. 1) is intermediately pivoted to the pedestal 11, and at the short end thereof, is pivoted a depending printing plunger 43. The long end of the lever 42 is connected to lever 37 by a connecting rod 44, preferably made adjustable by turn buckle 45. The lower end of the printing plunger 43 is arranged to work through the passage 28 of table 29, and to press the ticket against the alined type at the printing point, and it is formed with a laterally offset alining finger 46, that works between beveled alining lugs 47 secured on the anvil or platen 25 at one side of the table, and at one side of the printing bars.

I provide novel mechanism whereby it is made impossible to open the discharge gate of the scale hopper while the supply gate is open, and moreover, it is impossible to close the supply gate until the scale beam has been moved by the predetermined accumulated load in the hopper, and whereupon the said supply gate will be automatically closed when the said predetermined load is accumulated in the hopper.

To the above ends, a lock plunger 48 is mounted to slide through the upper plate of pedestal 11 and is subject to a leaf spring 49 that normally holds the free lower end of said plunger to its extreme position toward the right, in respect to Fig. 5. The upper end of this lock plunger 48 is connected by a link 50 to supply gate lever 36 (see Figs. 1 and 6). The free lower end of lock plunger 48 coöperates with a lock lug 51 shown as secured directly to platen 25, and hence, indirectly carried by scale beam 13, being located nearly directly over its fulcrum 14. When supply gate lever 36 is moved from closed to open position, that is, from lower to upper position, while scale beam 13 is held down by its poise, free end of lock dog 48 will automatically engage itself on top of lock lug 51, and thereby lock the supply gate lever in position to hold the supply gate open. Here it may be stated that by means presently to be described, discharge gate lever 37 cannot be moved from its closed or lower position to its open or upper position while the said supply gate lever is in its upper or gate opening position.

When the accumulated load of the scale hopper moves the scale beam 13 so as to raise the poise, lock lug 51 will be moved toward the right in respect to Fig. 5, or toward the left in respect to Fig. 1 and will thereby release lock plunger 48. When lock plunger 48 is thus released, supply gate may be closed, and in fact, in the preferred arrangement, will be automatically closed. It is customary to provide supply gate operating connection of weighing scale with weights or springs, usually the former, so that such supply gates will be automatically closed when their lever or operating connections are released.

For the purposes of this case it is only necessary to note that levers 36 and 37 are provided, respectively, with cam-acting lock fingers $36^a$ and $37^a$ (see Figs. 6 and 7), that coöperate with oblique cam flanges $36^b$ and $37^b$ on a sliding lock plate 52. This lock plate 52 is mounted to slide transversely in suitable guides on a cylindrical segmental bracket 53 rigidly secured to the pedestal 10. Fig. 7 shows the position of lock plate 52 and coöperating parts when supply gate lever 36 is in its raised or gate opening position and discharge gate lever 37 is in its lower or gate closing position. At such time it will be noted, cam acting lock finger $37^a$ is locked down by flange $37^b$. When supply gate lever 36 is moved downward to its gate closing position, its finger $36^a$, acting on flange $36^b$ will move lock plate 52 toward the right, in respect to Fig. 7, which will position flange $37^b$ to the right so that lock finger $37^a$ may move upward, and when moving upward, will act on said flange $37^b$ and move lock plate 52 to its extreme position to the right, thereby permitting lever 37 to move freely upward to open discharge gate.

When lever 37 is moved downward while lever 36 is in its lowered position, lock plate 52 will be moved toward the left by a similar, but reverse action.

Ticket feeding shaft 32, at its rear end, has a small ratchet wheel 54 that is engaged by a laterally projected tooth 55 of a feed dog 56 pivotally carried by the short end of lever 42. Dog 56 has a finger $56^a$ that is engageable with the extreme rear end of shaft 32 to insure engagement of tooth 55 with teeth of ratchet wheel under upward movement of the dog 56. This relative upward movement of dog 56 is produced when lever 42 is moved upward by that downward movement of lever 37 that is required to close the discharge gate. The printing on the ticket, it may be here noted, is, on the contrary, produced by that upward movement of lever 37 that is required to open the discharge gate. This causes the printing of the weight of the hopper load by the initial action required to effect the discharge thereof from the hopper.

Attention is recalled to the fact that, in this preferred arrangement, the spacing of notches 13ᵃ of scale beam 13 is such that they represent one hundred pounds to the notch for varying positions of main poise 21 on said beam. Hence, very accurate positioning of the main poise, in respect to notches, is highly important, since slight variations from absolutely correct positions would give aggregates varying materially from proper weight. Figs. 1 and 2 illustrate the above poise alining means. Poise 21 is formed hollow below the lower edge of beam 13 and is provided with two so-called alining dogs 57 and 58, the former designated as the primary and the latter as the secondary dogs. These two dogs are pivoted to the poise 21 at 59, but secondary dog 58 is longer than primary dog 57. The two dogs 57 and 58 at their points are provided, respectively, with alining wedges 57ᵃ and 58ᵃ, the latter of which is much sharper than the former, so that the two edges engage different surfaces of the notches 13ᵃ, to thereby distribute the wear, and, in fact, as will presently appear, to nearly or entirely relieve, wedge 58ᵃ and those portions of the notches with which it engages, from wear. Dogs 57 and 58 are yieldingly pressed upward by springs 57ᵇ and 58ᵇ seated in the main poise. Pivoted within the poise 21 at 60 and depending therefrom is a dog operating lever 61, the lower portion of which is spaced from but adjacent to an arm 62 fixed to the bottom of poise 21. At its pivoted upper end portion, lever 61 is a crank or cam-acting pin 61ᵃ and a cam lug 63. Pin 62 works in a notch of secondary dog 58 while cam lug 63 operates on the free end of primary dog 57.

Before poise 21 can be moved on beam 13, lever 61 must be forced toward arm 62 as far as it will go, to wit, farther toward the right than shown in Fig. 2, so as to first release secondary dog 58 and then to carry lug 63 beyond the free end of primary dog 57. When this is done, poise may be moved, because cam action of lug 57ᵃ will readily overcome light spring 57ᵇ. Here it may be stated that spring 57ᵇ might be entirely dispensed with. When poise 21 has been positioned in substantially correct position, lever 61 will be released and spring 58ᵇ will then force the lever 61 to its extreme position toward the left, to wit, to a position farther toward the left than shown in Fig. 2. The first effect of this movement of the lever 61 toward the left is to cause cam lug 63, acting on the free end of primary dog 57 upward, thereby crowding alining wedge 57 into the proper notch 13ᵃ. If this engagement of alining wedge 57ᵃ takes place while the poise is moving, it will take the shock incident to sudden stopping of the poise, and in any event, will insure almost positive accurate positioning of the poise.

The final part of the movement of lever 61 toward the left takes place coincident with the engagement of secondary alining wedge 58ᵃ with its notch 13ᵃ, and the engagement of this secondary alining wedge with said notch 13ᵃ insures absolute accurate positioning of the poise. The edges of the notches 13ᵃ, it will be noted, are convexly curved, so that the surfaces thereof engaged by wedge 58ᵃ will be inward of surfaces engaged by wedge 57ᵃ, this being done for a purpose already stated.

My invention makes it not only possible, but feasible and preferable to print the weights of the hopper loads, successively, on a record strip. The term "printing" is herein used in a broad sense to include any device for marking characters that represent weight or quantity.

What I claim is:

1. The combination with a gate actuating mechanism controlling the delivery of the material to and from a receptacle whose contents are weighed by said scale and a scale mechanism, the latter including a scale beam and a poise therefor, of a weight recording device arranged to be set by positioning of the poise, and means for completing the recording of the weight of the load represented by setting of the poise, automatically by a gate actuating movement of said gate actuating mechanism.

2. In a scale mechanism, the combination with a scale beam equipped with a platen and provided with main and fractional poises, of main and fractional type bars movable, respectively, with said main and fractional poises, over said platen, an oscillatory ticket supporting table for supporting a ticket above said platen, and a printing plunger operative on the ticket to press the same against the type alined at the printing point on said platen, said table and printing plunger being mounted to swing and connected to be swung by said scale beam.

3. In a scale mechanism, the combination with a scale beam equipped with a platen and provided with main and fractional poises, of main and fractional type bars movable, respectively, with said main and fractional poises, over said platen, a ticket supporting table for supporting a ticket above said platen, a printing plunger operative on the ticket to press the same against the type alined at the printing point on said platen, and gate actuating mechanism controlling the delivery of the material to and from a receptacle whose contents are weighed by said scale connected to said plunger for automatically producing the printing action.

4. In a scale mechanism, the combination with a scale beam equipped with a platen and provided with main and fractional poises, of main and fractional type bars movable, respectively, with said main and fractional poises, over said platen, an oscillatory ticket supporting table for supporting a ticket above said platen, a printing plunger operative on the ticket to press the same against the type alined at the printing point on said platen, a ticket feeding device associated with said table, and automatic means for alternating the ticket feeding movement with the printing action.

5. In a scale mechanism, the combination with a scale beam equipped with a platen and provided with main and fractional poises, of main and fractional type bars movable, respectively, with said main and fractional poises over said platen, a ticket supporting table for supporting a ticket above said platen, a printing plunger operative on the ticket to press the same against the type alined at the printing point on said platen, a ticket feeding mechanism associated with said table, gate actuating mechanism controlling the delivery of the material to and from a receptacle whose contents are weighed by said scale, and connections between said gate-actuating mechanism and said printing plunger and ticket feeding mechanism, whereby the printing and ticket feeding actions will be performed automatically in an alternated order.

6. In a scale mechanism, the combination with a scale beam having notches therein, of a poise slidable on said beam, primary and secondary lock dogs carried by said poise and having alining wedges engageable with the notches thereof, the alining wedges of said two dogs having different bevel and the wedge of one of said lock dogs being engageable deeper than the wedge of the other dog into the notches of said beam.

7. In a scale mechanism, the combination with a scale beam having notches therein, of a poise slidable on said beam, primary and secondary lock dogs carried by said poise and having alining wedges engageable with the notches thereof, and a lever carried by said poise and operative on said alining dogs, first to force the alining wedge of said primary dog into action, and, subsequently, to force the wedge of said secondary dog into action.

8. In a scale mechanism, the combination with a scale beam having notches therein, of a poise slidable on said beam, primary and secondary lock dogs carried by said poise and having alining wedges engageable with the notches thereof, and a lever carried by said poise and operative on said alining dogs, first to force the alining wedge of said primary dog into action, and subsequently, to force the wedge of said secondary dog into action, and a spring carried by said wedge and exerting a force tending to engage the alining wedge of said secondary dog with a notch of said beam.

In testimony whereof I affix my signature in presence of two witnesses.

CHARLES E. BIRD.

Witnesses:
 CLARA DEMAREST,
 BEMIN G. BAUMANN.